United States Patent [19]
Albert et al.

[11] Patent Number: 5,673,866
[45] Date of Patent: Oct. 7, 1997

[54] COIL FORM WITH POROUS COIL SUPPORT AND METHOD OF MAKING THE SAME

[75] Inventors: Elmar Albert, Neidlingen; Kuno Roder, Eglharting, both of Germany

[73] Assignee: Daimler-Benz Aerospace AG, Ottobrunn, Germany

[21] Appl. No.: 643,858

[22] Filed: May 7, 1996

[30] Foreign Application Priority Data

May 9, 1995 [DE] Germany ............... 195 16 899.2

[51] Int. Cl.$^6$ .................. B65H 55/00; B65H 75/12; C09J 5/00; B28B 21/08
[52] U.S. Cl. ............. 242/173; 156/172; 156/306.3; 247/118.32; 247/118.7; 247/610.6; 425/84
[58] Field of Search .................. 242/159, 173, 242/18 R, 118.32, 118.7, 118, 610.6; 156/172, 306.3, 173, 425; 425/84

[56] References Cited

U.S. PATENT DOCUMENTS

| | | | |
|---|---|---|---|
| 1,683,273 | 9/1928 | Wanders | 242/118.7 |
| 1,777,571 | 10/1930 | McCullough | 156/172 X |
| 3,856,225 | 12/1974 | Wray | 242/118.32 |
| 3,910,513 | 10/1975 | Gelin et al. | 242/118.32 X |
| 5,064,490 | 11/1991 | Chapin et al. | 242/173 X |
| 5,161,208 | 11/1992 | Christie et al. | 242/173 X |
| 5,205,890 | 4/1993 | Darsey et al. | 156/173 X |
| 5,245,687 | 9/1993 | Usui | 242/118 X |

*Primary Examiner*—Michael Mansen
*Attorney, Agent, or Firm*—McGlew and Tuttle

[57] ABSTRACT

A coil form with a coil support and with a winding applied thereto, whose turns are provided with a coil bond material. The bond material contains a volatile solvent and mutually fixes the turns when dried (in a dry state). To guarantee an essentially uniform, nearly solvent residue-free drying of the coil bond in the entire winding even in the case of a very large number of coil layers, the coil support is a porous coil support having open pores. The coil support has a diffusion coefficient with respect to the solvent that is equal to or slightly lower than that of the winding.

24 Claims, 1 Drawing Sheet

COIL FORM WITH POROUS COIL SUPPORT AND METHOD OF MAKING THE SAME

FIELD OF THE INVENTION

The present invention pertains to a coil form with a coil support and with a winding applied to the coil support wherein the turns of the winding are provided with a coil bond incorporated into the material, which contains a volatile solvent and mutually fixes the turns in a dried state.

BACKGROUND OF THE INVENTION

One important field of application of coil forms of this type is their use, wound with a fiber-optic waveguide of a length of up to 100 km or more, on board a missile or a land craft or water craft. The fiber-optic waveguide is unwound from the coil form mounted non-rotatably on the vehicle in the axial direction of the coil form during the flight or during the travel opposite the direction of travel in order to make possible a continuous exchange of data between the moving vehicle and a stationary receiving station via the fiber-optic waveguide. During the winding of the coil support, the fiber-optic waveguide is provided with an adhesive or lacquer layer, which contains a volatile solvent and forms a coil bond incorporated in the material between the individual turns of the winding after drying. On the one hand, such an adhesive layer very substantially facilitates the manufacture of the winding and imparts the necessary strength to it, so that it will not be destroyed during vibrations or under mechanical or thermal loads in such a way that a loss of function would occur during the subsequent rapid pulling off of the fiber-optic waveguide, i.e., in such a way that the winding would disintegrate into individual coil layers. A relatively high adhesive force is therefore desirable. On the other hand, the friction of the fiber-optic waveguide and the tensile stress acting during the unwinding must not assume excessively high values. Therefore the adhesive force must be maintained within certain limits. The run-off behavior of the fiber-optic waveguide is greatly influenced by non-uniform, abruptly changing adhesive forces of the winding, and microbends of the fiber-optic waveguide, which may interfere with the signal transmission and even lead to a complete failure of the system, may occur, especially at the point of separation from the winding. To reach a defined adhesive force, uniform drying of the entire winding is necessary, in addition to the use of a suitable adhesive.

However, the air-side outer surfaces of the winding dry very rapidly in the prior-art coil forms of the type described in the introduction, so that an adhesive or lacquer film is formed there, which prevents the further diffusion of the solvent from the interior of the winding and consequently, the drying of the coil bond in the deeper coil layers. The consequence of this is that the winding will have a non-uniform coil bond without defined adhesive forces even after prolonged storage times, and there is a risk that the solvent residues having remained in the winding will penetrate into the fiber-optic waveguide and increase the basic attenuation of the fiber-optic waveguide there, or even cause the formation of potential breaking points, which will then lead to an interruption of the signal transmission path and consequently to a complete system failure during the rapid unwinding of the fiber-optic waveguide.

SUMMARY AND OBJECTS OF THE INVENTION

The primary object of the present invention is to improve the coil form of the type described in the introduction such that the solvent residues in the interior of the winding are markedly reduced in a simple manner in terms of design, and a substantially more uniformly effective coil bond is achieved between the individual turns of the winding.

According to the invention, a coil form is provided with a coil support and with a winding applied on the coil support. The winding is provided with turns wherein the turns of the winding have a coil bond material therebetween. The coil bond contains a volatile solvent and mutually fixes the turns in a dried state. The coil support is provided as a porous coil support having open pores. The winding has a diffusion coefficient. The coil support is provided with a diffusion coefficient that is substantially equal to or slightly lower than that of the winding.

Based on the special design of the coil support, which no longer acts as a diffusion barrier, but is designed as a porous coil support, the solvent can diffuse radially inwardly via the coil support in the coil form according to the present invention. It is essential in this connection that it is guaranteed due to the special degree of porosity of the coil support that the rate of diffusion in the coil support is kept approximately as low in the coil support as in the winding itself, and no diffusion-hindering barrier layer in the form of an adhesive or lacquer layer can therefore be formed at the interface between the winding and the coil support, because the coil bond cannot dry immediately at this interface. Therefore, solvent continuously diffuses from the interior of the winding, and it escapes into the surrounding atmosphere via the coil support, until the winding has completely dried. The solvent residues in the interior of the winding are reduced as a result, and a highly uniform adhesive bond is guaranteed over the entire winding. In addition, the drying process takes place relatively continuously, so that stresses are prevented from building up in the winding.

As was mentioned, one especially preferred application of the present invention is the one in which the winding comprises a fiber-optic waveguide, whose turns are provided with an adhesive or lacquer layer as a coil bond. The coil form is arranged in this case preferably non-rotatably on board a vehicle, and the fiber-optic waveguide is pulled off in the axial direction of the coil form during travel or during flight.

In order for the solvent concentration in the winding to decrease as rapidly as possible, the coil bond preferably contains a highly volatile solvent such as toluene. However it is also possible, if desired, to use coil bonds with another solvent, e.g., those based on water. At any rate, the porosity of the coil support is to be adapted to the solvent. The porosity is preferably between about 70% and 97%, and a highly volatile solvent requires a lower porosity than a water-based coil bond.

Metal oxides, sintered metals or ceramic materials may be used as especially preferred basic materials for the coil support. To keep the diffusion paths in the coil support short, i.e., not only for weight reasons, the coil support is preferably designed as a hollow cylinder which is porous in the wall area.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
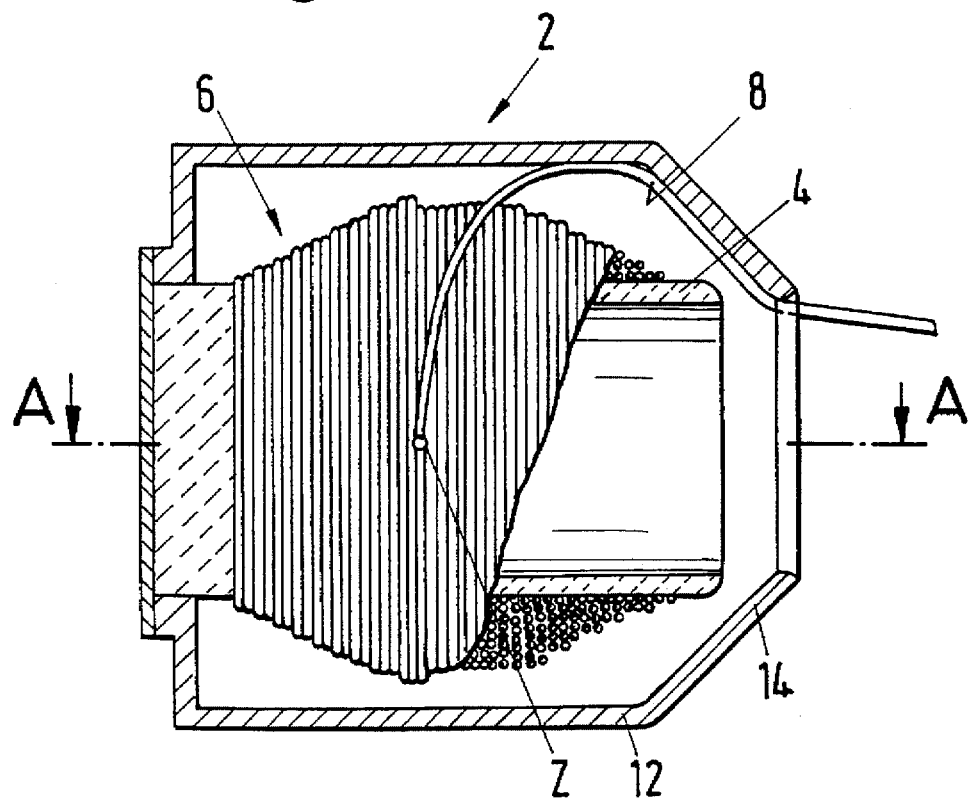
FIG. 1 is a partially cutaway schematic view of a coil form with a winding comprising a fiber-optic waveguide.
Figure 2:
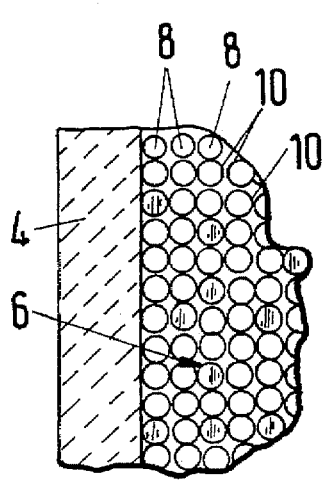
FIG. 2 is an enlarged detail of the coil form according to FIG. 1 in the interface area between the winding and the coil support.

The coil form 2 shown in the figures contains as its principal components a hollow cylindrical coil support 4 and a winding 6 applied thereto, which comprises a fiber-optic waveguide 8, which is wound endlessly on the coil support 4 in turns spaced closely next to each other and one above another. The thickness of the fiber-optic waveguide 8 is shown in a greatly exaggerated manner for clarity's sake; the number of coil layers and of individual turns located next to each other in the winding 6 is, in fact, many times greater.

During the winding process, the fiber-optic waveguide 8 is provided with a solvent-containing coil bond 10 in the form of an adhesive or lacquer layer, with which the fiber-optic waveguide 8 is either coated before a winding station, e.g., in a dipping bath, not shown, or which is applied, e.g., brushed, to a coil layer after it has been prepared. In the dried state, the coil bond 10 imparts the necessary strength to the winding 6 to prevent it from being destroyed during vibrations or other mechanical or thermal shocks, but also to prevent functional disturbances from occurring during the subsequent rapid unwinding of the fiber-optic waveguide 8.

FIG. 1 shows the coil form 2 during the unwinding process on board an missile, land craft or water craft (not shown), on which the coil form 2 is stationarily mounted and is included in an outer shell 12 with a run-off funnel 14 opening in the rearward direction opposite the flight or travel direction. The fiber-optic waveguide 8, which makes possible a continuous exchange of data between the moving vehicle and a receiving station (likewise not shown), to which the free end of the fiber-optic waveguide is connected, performs a rotary movement around the axis A of the coil form during the unwinding process, once per coil winding pulled off, so that it rises, under the effect of the resulting centrifugal force, essentially tangentially to the instantaneous pull-off point Z from the winding 6, radially to the outside in the direction of the shell 12, from which it will run off in the rearward direction via the run-off funnel 14. To ensure a trouble-free unwinding process, a defined coil bond 10 free from abrupt changes in the adhesive force is necessary between the turns of the winding 6.

To achieve this, the solvent must have diffused nearly completely from the winding 6. At the end of the winding process, the coil bond 10 still has a comparatively high solvent concentration (a according to FIG. 3), which is essentially constant over the entire radial coil thickness of the winding 6. Due to the unhindered evaporation of the solvent on the air-side outer surfaces of the winding 6, an adhesive or lacquer layer 16 is formed there very rapidly, and it acts as a diffusion-inhibiting or -interrupting barrier layer, and it prevents the removal of more solvent from the interior of the winding 6 to the surrounding atmosphere. Prior-art coil forms therefore continue to have high solvent concentrations at the more deeply located inner coil windings and a highly non-uniform state of drying, changing abruptly toward the outer skin, even after longer drying times (see concentration curve b according to FIG. 3).

Figure 3:
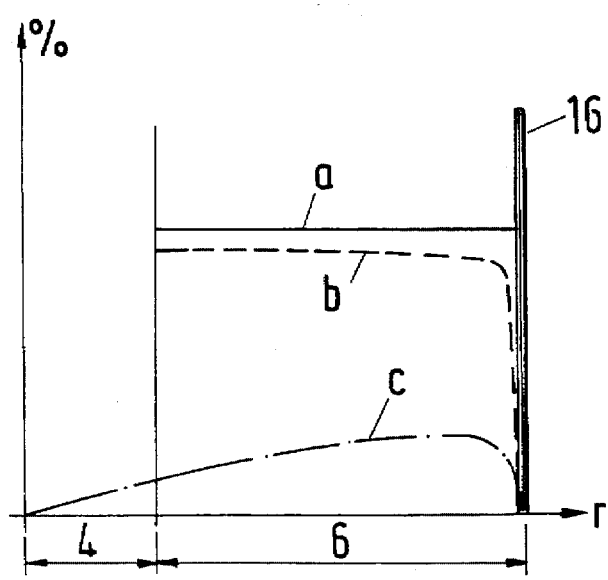
FIG. 3 is a diagram showing the changes in the solvent concentration at the beginning of the drying process (a), in prior-art coil forms after a relatively long drying time (b), and in the coil form according to the present invention during drying (c).

Nearly complete drying of the coil bond 10 is guaranteed over the entire winding 6 due to the design of the coil support 4 described below even in the case of a very great winding thickness. The coil support 4 is made for this purpose from a porous material having open pores, e.g., a metal oxide, a sintered metal, or a ceramic material, and it has a degree of porosity between about 70% and 97%, which is selected as a function of the solvent such that the diffusion coefficient of the coil support 4 with respect to the solvent is approximately equal to the diffusion coefficient of the winding 6 with respect to the solvent or slightly lower. As a consequence, the solvent diffuses, beginning from the initial state a according to FIG. 3, into the pores of the coil support 4 because of the difference in the solvent concentration at the interface between the coil support 4 and the winding 6, and the solvent having diffused through escapes from the inner surface of the coil support 4 into the surrounding atmosphere. Since the diffusion coefficient of the coil support 4 is adapted to that of the winding 6, no diffusion-inhibiting or -interrupting barrier layer in the form of an adhesive or lacquer layer is formed at the coil support-side interface of the winding 6, because the coil bond 10 cannot dry immediately at this interface. More solvent diffuses continuously from the interior of the winding 6. The solvent concentration thus decreases slowly over the entire radial width of the winding 6, until the coil bond 10 has dried completely. FIG. 3c shows the changes in the solvent concentration in the winding 6 and in the coil support 4 during drying. An extensively solvent residue-free, uniform coil bond 10 of the winding 6 is thus obtained after the end of the drying process.

Both adhesives and lacquers with a highly volatile solvent, e.g., toluene, may be used for the coil bond 10 in conjunction with a relatively low degree of porosity of the coil support 4 (about 70%), but it is also possible to use water-based adhesives or lacquers, which require a correspondingly higher degree of porosity of the coil support 4 (about 95%).

While specific embodiments of the invention have been shown and described in detail to illustrate the application of the principles of the invention, it will be understood that the invention may be embodied otherwise without departing from such principles.

What is claimed is:

1. A coil form, comprising:

a coil support;

a winding applied to the coil support, said winding having turns provided with a coil bond incorporated into the winding, said coil bond containing a solvent and said coil bond fixing said turns when said coil bond is in a dried state, said coil support being porous and having open pores defining a diffusion coefficient with respect to said solvent, said winding having a diffusion coefficient with respect to said solvent, said coil support diffusion coefficient being substantially equal to said diffusion coefficient of said winding.

2. A coil form according to claim 1, wherein said winding comprises a fiber-optic waveguide and said coil bond is an adhesive.

3. A coil form according to claim 2, wherein said coil form is disposed non-rotatably and said fiber-optic waveguide is pulled off based on a direction of pulling which is an axial direction with respect to said coil form.

4. A coil form according to claim 1, wherein said coil bond contains a highly volatile solvent.

5. A coil form according to claim 4, wherein said volatile solvent is toluene.

6. A coil form according to claim 1, wherein said coil bond contains water as the solvent.

7. A coil form according to claim 1, wherein said coil support has a porosity between 70% and 97%.

8. A coil form according to claim 1, wherein said coil support is formed of one of a metal oxide, a sintered metal, and a ceramic material.

9. A coil form in accordance with claim 1, wherein said coil support is designed as a hollow cylindrical coil core which is porous in a wall area.

10. A coil form according to claim 1, wherein said winding comprises a fiber-optic waveguide and said coil bond is a lacquer layer.

11. A method of producing a coil form, comprising:

providing a porous coil support having open pores, the porous coil support having a diffusion coefficient with respect to a solvent;

winding a fiber-optic waveguide, a solvent-containing coil bond being applied to the fiber-optic waveguide to coat the fiber-optic waveguide, the fiber-optic waveguide forming a winding with a diffusion coefficient with respect to the solvent; and providing that the diffusion coefficient of the coil support is substantially equal to said diffusion coefficient of the winding with respect to the solvent.

12. A method of producing a coil form according to claim 11, wherein said coil bond is provided as an adhesive.

13. A method according to claim 12, further comprising arranging said coil form on board a vehicle positioned for pulling off said fiber-optic waveguide during travel in a direction of pulling, said direction of pulling being an axial direction of said coil form.

14. A coil form according to claim 11, wherein said coil bond contains a highly volatile solvent.

15. A method according to claim 14, wherein said volatile solvent is toluene.

16. A method according to claim 11, wherein water is provided as the solvent for the coil bond.

17. A method according to claim 11, wherein said porosity of said coil support is selected to be between 70% and 97%.

18. A method according to claim 11, whereto said coil support is prepared from one of metal oxide, a sintered metal and a ceramic material.

19. A method according to claim 11, wherein said coil support is designed as a hollow cylindrical core which is porous in a wall area.

20. A method of producing a coil form according to claim 11, wherein said coil bond is provided as a lacquer layer.

21. A method of producing a coil form according to claim 11, wherein said coil bond is applied before winding.

22. A method of producing a coil form according to claim 11, wherein said coil bond is applied subsequent to winding.

23. A coil form, comprising:

a coil support;

a winding applied to the coil support, said winding having turns provided with a coil bond incorporated into the winding, said coil bond containing a solvent and said coil bond fixing said turns when said coil bond is in a dried state, said coil support being porous and having open pores defining a diffusion coefficient with respect to said solvent, said winding having a diffusion coefficient with respect to said solvent, said coil support diffusion coefficient being somewhat lower than said diffusion coefficient of said winding.

24. A method of producing a coil form, comprising:

providing a porous coil support having open pores, the porous coil support having a diffusion coefficient with respect to a solvent;

winding a fiber-optic waveguide, a solvent-containing coil bond being applied to the fiber-optic waveguide to coat the fiber-optic waveguide, the fiber-optic waveguide forming a winding with a diffusion coefficient with respect to the solvent; and providing that the diffusion coefficient of the coil support is slightly lower than the diffusion coefficient of the winding with respect to the solvent.

* * * * *